United States Patent
Yano et al.

(10) Patent No.: US 8,030,494 B2
(45) Date of Patent: Oct. 4, 2011

(54) OPTICAL RECORDING MATERIAL

(75) Inventors: Toru Yano, Tokyo (JP); Yohei Aoyama, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/441,949

(22) PCT Filed: Oct. 2, 2007

(86) PCT No.: PCT/JP2007/069240
§ 371 (c)(1),
(2), (4) Date: Mar. 19, 2009

(87) PCT Pub. No.: WO2008/044534
PCT Pub. Date: Apr. 17, 2008

(65) Prior Publication Data
US 2009/0270636 A1    Oct. 29, 2009

(30) Foreign Application Priority Data
Oct. 10, 2006 (JP) ................... 2006-276616

(51) Int. Cl.
C07D 207/12 (2006.01)
C07D 233/54 (2006.01)
C07D 233/56 (2006.01)
C07D 233/58 (2006.01)

(52) U.S. Cl. ........................ 548/103; 548/402

(58) Field of Classification Search .............. 548/101, 548/300.1, 302.7, 402, 452; 514/393, 396, 514/408, 412
See application file for complete search history.

(56) References Cited

U.S. PATENT DOCUMENTS
2003/0224293 A1    12/2003    Oya et al.

FOREIGN PATENT DOCUMENTS

| JP | 61-126555 | 6/1986 |
|---|---|---|
| JP | 2001-47740 | 2/2001 |
| JP | 2001-301333 | 10/2001 |
| JP | 2004-098542 | 4/2004 |
| JP | 2006-150841 | 6/2006 |
| WO | 2006/035554 | 4/2006 |

OTHER PUBLICATIONS

European Patent Office issued an European Search Report dated Sep. 14, 2009, Application No. 07828980.8.

*Primary Examiner* — Yong Chu
*Assistant Examiner* — Michael Barker
(74) *Attorney, Agent, or Firm* — Young & Thompson

(57) ABSTRACT

An optical recording material containing a compound of formula (I):

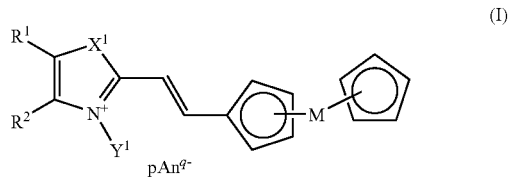

wherein $R^1$ and $R^2$ each represent hydrogen, hydroxyl, halogen, nitro, cyano, a C1-C30 organic group, or a group of formulae (II), (II') or (III); or $R^1$ and $R^2$ are connected to form a ring; $X^1$ is $-CR^3R^4-$ or $-NH-$; $Y^1$ is a C1-C30 organic group or a substituent of formulae (II), (II') or (III); $R^3$ and $R^4$ each represent hydrogen, a C1-C30 organic group, or a group of formulae (II), (II') or (III), provided that, when $Y^1$ is a group of formula (III), $R^3$ is hydrogen, a C1-C30 organic group, or a group of formulae (II), (II') or (III), and when $Y^1$ is a C1-C30 organic group or a group of formulae (II) or (II'), $R^3$ is a group of formulae (II), (II') or (III); M is Fe, Co, Ni, Ti, Cu, Zn, Zr, Cr, Mo, Os, Mn, Ru, Sn, Pd, Rh, Pt, or Ir; $An^{q-}$ is a q-valent anion, p is a number necessary to neutralize an electric charge; and q is 1 or 2.

16 Claims, No Drawings

OPTICAL RECORDING MATERIAL

TECHNICAL FIELD

This invention relates to an optical recording material used in an optical recording medium on which information can be written as an information pattern mostly with a laser beam. More particularly, it relates to an optical recording material used in an optical recording medium capable of high-density optical writing and reading using a low energy laser having a wavelength in the visible to ultraviolet region.

BACKGROUND ART

Optical recording media have spread widely generally because of their superiority, such as high recording capacity and non-contact write/read system. Recordable optical disks, such as WORMs, CD-Rs, and DVD±Rs, record information by irradiating a very small area of the optical recording layer with a focused laser beam to change the properties of the irradiated area and reproduce the recorded information making use of the difference in reflected light quantity between the recorded and non-recorded areas.

Wavelengths of semiconductor lasers used in writing and reading information on the currently available optical disks of the type described are in the ranges of 750 to 830 nm for CD-Rs and of 620 to 690 nm for DVD-Rs. In pursuit of a further increased capacity, optical disks using shorter wavelength lasers have been under study. For example, those using a write wavelength of 380 to 420 nm have been studied.

Various kinds of compounds are used to form an optical recording layer of optical recording media for short wavelength lasers. For example, Patent Document 1 reports an optical recording medium containing a metallocene derivative having an indolenine skeleton as a light stabilizer or pit controlling agent; and Patent Document 2, Patent Document 3, and Patent Document 4 disclose optical recording media containing a cyanine compound having a specific structure. These compounds, however, are not always good for use as an optical recording material forming an optical recording layer in view of their absorption wavelength characteristics or solubility in a solvent used to form an optical recording layer.

Patent Document 1: JP 2001-47740A
Patent Document 2: JP 2001-301333A
Patent Document 3: JP 2004-98542A
Patent Document 4: JP 2006-150841A

DISCLOSURE OF THE INVENTION

Problem to be Solved by the Invention

An object of the invention is to provide an optical recording material containing a compound suited to form an optical recording layer of an optical recording medium for short wavelength writing light.

Means for Solving the Problem

As a result of extensive investigations, the inventors have found that a metallocene derivative having a specific structure has high solubility and absorption wavelength characteristics suitable to form an optical recording layer of an optical recording medium for short wavelength writing light and that use of the compound provides a means to accomplish the above object of the invention.

Based on the above findings, the invention has accomplished the above object by the provision of an optical recording material containing at least one compound represented by general formula (I) shown below.

[Formula 1]

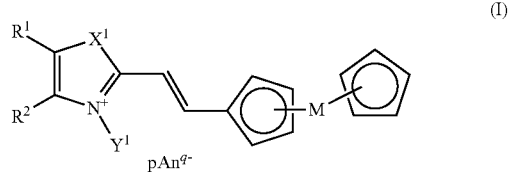

(I)

wherein $R^1$ and $R^2$ each independently represent a hydrogen atom, a hydroxyl group, a halogen atom, a nitro group, a cyano group, an organic group having 1 to 30 carbon atoms, or a group represented by general formulae (II), (II') or (III) below; $R^1$ and $R^2$ may be taken together to form a ring structure; $X^1$ represents —$CR^3R^4$— or —NH—; $Y^1$ represents an organic group having 1 to 30 carbon atoms, or a substituent represented by general formulae (II), (II') or (III) below; $R^3$ and $R^4$ each represent a hydrogen atom, an organic group having 1 to 30 carbon atoms, or a group represented by general formulae (II), (II') or (III) below provided that, when $Y^1$ is a group represented by general formula (III), $R^3$ is a hydrogen atom, an organic group having 1 to 30 carbon atoms, or a group represented by general formulae (II), (II') or (III), and when $Y^1$ is an organic group having 1 to 30 carbon atoms or a group represented by general formulae (II) or (II'), $R^3$ is a group represented by general formulae (II), (II') or (III); M represents Fe, Co, Ni, Ti, Cu, Zn, Zr, Cr, Mo, Os, Mn, Ru, Sn, Pd, Rh, Pt, or Ir; $An^{q-}$ represents a q-valent anion, p is a number necessary to neutralize an electric charge; and q is 1 or 2.

[Formula 2]

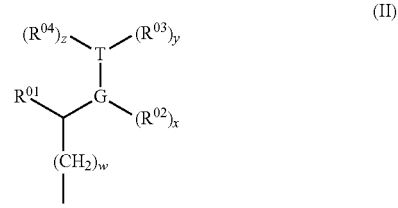

(II)

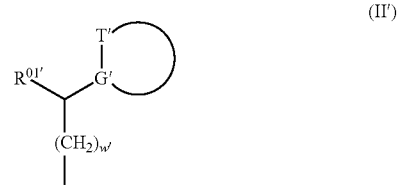

(II')

in the general formula (II), the bond between G and T is a double bond, a conjugated double bond, or a triple bond; G represents a carbon atom; T represents a carbon atom, an oxygen atom, or a nitrogen atom; w represents a number of 0 to 4; x, y, and z each represent 0 or 1 provided that, when T is oxygen, y=z=0, and when T is nitrogen, y+Z=0 or 1; $R^{01}$, $R^{02}$, $R^{03}$, and $R^{04}$ each independently represent a hydrogen atom, a hydroxyl group, a cyano group, a nitro group, a halogen atom, or a substituted or unsubstituted alkyl group having 1 to 4 carbon atoms, the methylene moiety of which may be substituted with —O— or —CO—; and $R^{01}$ and $R^{04}$ may be taken together to form a ring structure; in the general formula (II'), the bond between G' and T' is a double bond or a conjugated double bond; G' represents a carbon atom; T' represents a carbon atom or a nitrogen atom; w' represents a number of 0 to 4; $R^{01'}$ represents a hydrogen atom, a hydroxyl group, a cyano group, a nitro group, a halogen atom, or a substituted or unsubstituted alkyl group having 1 to 4 carbon atoms, of which the methylene moiety may be substituted with —O— or —CO—; and the ring containing G' and T' is a 5-membered ring that may contain a hetero atom, a 6-membered ring that may contain a hetero atom, a naphthalene ring, a quinoline ring, an isoquinoline ring, an anthracene ring, or an anthraquinone ring and may be substituted with a halogen atom, a nitro group, a cyano group, an alkyl group or an alkoxy group.

[Formula 3]

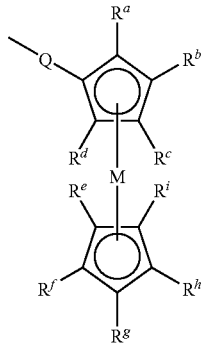

(III)

wherein $R^a$, $R^b$, $R^c$, $R^d$, $R^e$, $R^f$, $R^g$, $R^h$, and $R^i$ each independently represent a hydrogen atom or a substituted or unsubstituted alkyl group having 1 to 4 carbon atoms, the methylene moiety of which may be substituted with —O— or —CO—; Q represents a single bond or a substituted or unsubstituted alkylene group having 1 to 10 carbon atoms, of which the methylene group may be substituted with —O—, —S—, —CO—, —COO—, —OCO—, —SO$_2$—, —NH—, —CONH—, —NHCO—, —N═CH—, or —CH═CH—; and M is as defined above.

The above object of the invention is also achieved by the provision of an optical recording medium having a substrate and an optical recording layer formed of the above-described optical recording material on the substrate.

BEST MODE FOR CARRYING OUT THE INVENTION

The optical recording material of the present invention will be described in detail based on its preferred embodiments.

The halogen atom as represented by $R^1$ and $R^2$ in general formulae (I) and (IV) is exemplified by fluorine, chlorine, bromine, and iodine. The organic groups with 1 to 30 carbon atoms as represented by $R^1$, $R^2$, and $R^3$, $R^4$, and $Y^1$ of $X^1$ in general formulae (I), (IV), (V), and (VI), except those of general formulae (II), (II'), and (III), are not limited and include an alkyl group, such as methyl, ethyl, propyl, isopropyl, butyl, sec-butyl, tert-butyl, isobutyl, amyl, isoamyl, tert-amyl, hexyl, cyclohexyl, cyclohexylmethyl, 2-cyclohexylethyl, heptyl, isoheptyl, tert-heptyl, n-octyl, isooctyl, tert-octyl, 2-ethylhexyl, nonyl, isononyl, decyl, dodecyl, tridecyl, tetradecyl, pentadecyl, hexadecyl, heptadecyl, or octadecyl; an alkenyl group, such as vinyl, 1-methylethenyl, 2-methylethenyl, propenyl, butenyl, isobutenyl, pentenyl, hexenyl, heptenyl, octenyl, decenyl, pentadecenyl, or 1-phenylpropen-3-yl; an alkylaryl group, such as phenyl, naphthyl, 2-methylphenyl, 3-methylphenyl, 4-methylphenyl, 4-vinylpehnyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-t-butylphenyl, or cyclohexylphenyl; an arylalkyl group, such as benzyl, phenethyl, 2-phenylpropan-2-yl, diphenylmethyl, triphenylmethyl, styryl, or cinnamyl; and the hydrocarbon groups recited above which are interrupted with an ether linkage or a thioether linkage, such as 2-methoxyethyl, 3-methoxypropyl, 4-methoxybutyl, 2-butoxyethyl, methoxyethoxyethyl, methoxyethoxyethoxyethyl, 3-methoxybutyl, 2-phenoxyethyl, 2-methylthioethyl, and 2-phenylthioethyl. The above recited groups may be substituted with an alkoxy group, an alkenyl group, a nitro group, a cyano group, a halogen atom, etc.

Examples of the ring structure formed by the connection of $R^1$ and $R^2$ in general formula (I) include a cyclopropane, a cyclobutane, a cyclopentane, a cyclohexane, a benzene, a naphthalene, an anthracene, a piperidine, a piperazine, a pyrrolidine, a morpholine, a thiomorpholine, a pyridine, a pyrazine, a pyrimidine, a pyridazine, a triazine, a quinoline, an isoquinoline, an imidazole, an oxazole, an imidazolidine, a pyrazolidine, an isoxazolidine, and an isothiazolidine ring.

The organic group having 1 to 30 carbon atoms as represented by $R^1$, $R^2$, $Y^1$, and $R^4$ of $X^1$ in general formula (I) and the ring structure formed by the connection of $R^1$ and $R^2$ in general formula (I) may have a substituent. Examples of the substituent are described below. In the cases where $R^1$, $R^2$, $Y^1$, and $R^4$ of $X^1$ is the organic group having 1 to 30 carbon atoms and a carbon-containing substituent selected from the groups described below, the total number of carbon atoms of the organic group inclusive of the substituent should fall within the range recited. Examples of the substituent are: alkyl groups such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, and decyl; alkoxy groups such as methoxy, ethoxy, propoxy, isopropoxy, butoxy, sec-butoxy, tert-butoxy, isobutoxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, and decyloxy; alkylthio groups such as methylthio, ethylthio, propylthio, isopropylthio, butylthio, sec-butylthio, tert-butylthio, isobutylthio, amylthio, isoamylthio, tert-amylthio, hexylthio, cyclohexylthio, heptylthio, isoheptylthio, tert-heptylthio, n-octylthio, isooctylthio, tert-octylthio, and 2-ethylhexylthio; alkenyl groups such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl, and tricosenyl; aralkyl groups such as benzyl, phenethyl, diphenylmethyl, triphenylmethyl, styryl, and cinnamyl; aryl groups such as phenyl and naphthyl; aryloxy groups such as phenoxy and naphthoxy; arylthio groups such as phenylthio and naphthylthio; heterocyclic groups such as pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, and 2,4-dioxyoxazolidin-3-yl; halogen atoms such as fluorine, chlorine, bromine, and iodine; acyl groups such as acetyl, 2-chloroacetyl, propionyl, octanoyl, acryloyl, methacryloyl, phenylcarbonyl (benzoyl), phthaloyl, 4-trifluoromethylbenzoyl, pivaloyl, salicyloyl, oxaloyl, stearoyl, methoxycarbonyl, ethoxycarbonyl, t-butoxycarbonyl, n-octadecyloxycarbonyl, and carbamoyl; acyloxy groups such as acetyloxy and benzoyloxy; an amino group; substituted amino groups such as ethylamino, dimethylamino, diethylamine, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamio, t-butoxycarbonylamino, n-octadecyloxycarbonylamio, N-methyl-methoxycarbonylamino, phenoxycarbonylamino, sulfamoylamino, N,N-dimethylaminosulfonylamino, methylsulfonylamino, butylsulfonylamino, and phenylsulfonylamino; a sulfonamide group, a sulfonyl group, a carboxyl group, a cyano group, a sulfo group, a hydroxyl group, a nitro group, a mercapto group, an imide group, a carbamoyl group, and a sulfonamido group. These substituents may further be substituted. The carboxyl group and the sulfo group may form a salt.

In general formula (I), examples of the anion as represented by $An^{q-}$ which is monovalent include halide anions such as a chloride, a bromide, an iodide, and a fluoride ion; inorganic anions such as a perchlorate, a chlorate, a thiocyanate, a hexafluorophosphate, a hexafluoroantimonate, and a tetrafluoroborate anion; organic sulfonate anions such as a benzenesulfonate, a toluenesulfonate, a trifluoromethanesulfonate, a diphenylamine-4-sulfonate, a 2-amino-4-methyl-5-chlorobenzenesulfonate anion, a 2-amino-5-nitrobenzenesulfonate, and an N-alkyl(or aryl)diphenylamine-4-sulfonate ion; organic phosphate anions such as an octylphosphate, a dodecylphosphate, octadecylphosphate, a phenylphosphate, a nonylphosphate, a 2,2'-methylenebis(4, 6-di-tert-butylphenyl)phosphate anion; a bis(trifluoromethylsulfonyl)imide anion, a bis(perfluorobutanesulfonyl)imide anion, a perfluoro-4-ethylcyclohexanesulfonate anion, a tetrakis(pentafluorophenyl)borate anion, and a tris(fluoroalkylsulfonyl)carbanion. Examples of the anion $An^{q-}$ which is divalent include a benzenedisulfonate and a naphthalenedisulfonate anion. If desired, a quencher anion capable of deexciting (quenching) an active molecule in an excited state, a metallocene compound anion of, for example, a ferrocene or a ruthenocene compound having an anionic group (e.g., a carboxyl group, a phosphonic acid group, or a sulfonic acid group) on its cyclopentadienyl ring can be used. P is selected so that the whole molecule may be electrically neutral.

Examples of the quencher anion include anions represented by general formulae (A) and (B) and formulae (C) and (D) shown below and those described in JP 60-234892A, JP 5-43814A, JP 5-305770A, JP 6-239028A, JP 9-309886A, JP 9-323478A, JP 10-45767A, JP 11-208118A, JP 2000-168237A, JP 2002-201373A, JP 2002-206061 A, JP 2005-297407A, JP 7-96334B, and WO98/29257.

[Formula 4]

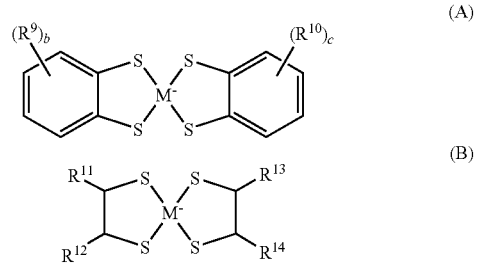

wherein M is as defined in general formula (I); $R^9$ and $R^{10}$ each represent a halogen atom, an alkyl group having 1 to 8 carbon atoms, an aryl group having 6 to 30 carbon atoms, or $-SO_2-J$; J represents an alkyl group, an aryl group, a halogen-substituted aryl group, a dialkylamino group, a diarylamino group, a piperidino group or a morpholino group; b and c each independently represent a number of 0 to 4; and $R^{11}$, $R^{12}$, $R^{13}$, and $R^{14}$ each independently represent an alkyl group, an alkylphenyl group, an alkoxyphenyl group, or a halogen-substituted phenyl group.

[Formula 5]

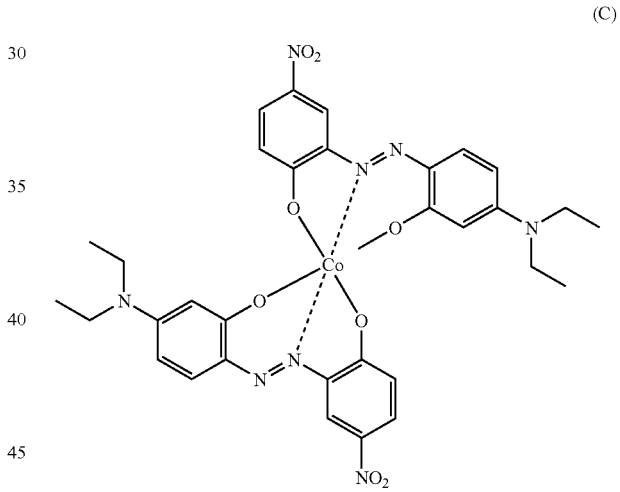

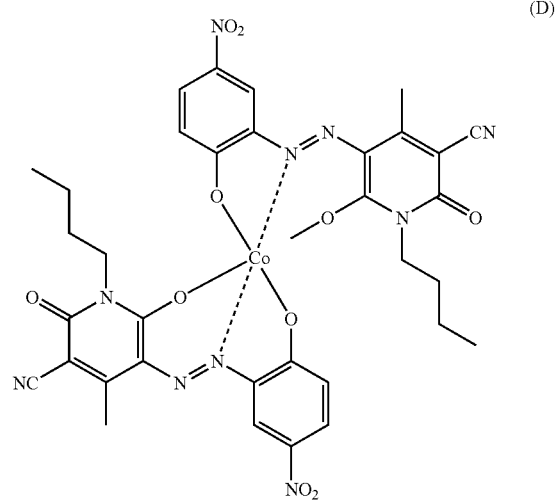

Examples of the halogen atom as represented by $R^{01}$, $R^{02}$, $R^{03}$, and $R^{04}$ in general formula (II) and $R^{01'}$ in general formula (II') include those enumerated with respect to general formula (I). Examples of the alkyl group having 1 to 4 carbon atoms as represented by $R^{01}$, $R^{02}$, $R^{03}$, and $R^{04}$ in general formula (II) and $R^{01'}$ in general formula (II) include methyl, ethyl, propyl, isopropyl, butyl, sec-butyl, tert-butyl, and isobutyl. Examples of the alkyl group a methylene moiety of which is substituted with —O— include methoxy, ethoxy, propoxy, isopropoxy, methoxymethyl, ethoxymethyl, and 2-methoxyethyl. Examples of the alkyl group a methylene moiety of which is substituted with —CO— include acetyl, 1-carbonylethyl, acetylmethyl, 1-carbonylpropyl, 2-oxobutyl, 2-acetylethyl, and 1-carbonylisopropyl. Examples of the ring structure formed by the connection of $R^{01}$ and $R^{04}$ in general formula (II) include those described with respect to general formula (I). The alkyl group having 1 to 4 carbon atoms as represented by $R^{01}$, $R^{02}$, $R^{03}$, and $R^{04}$ in general formula (II) and $R^{01'}$ in general formula (II') and the ring structure formed by the connection of $R^{01}$ and $R^{04}$ in general formula (II) may each have a substituent. Examples of the substituent are the same as those recited above with respect to the general formula (I). In the cases where $R^{01}$, $R^{02}$, $R^{03}$, $R^{04}$, and $R^{01'}$ is the alkyl group having 1 to 4 carbon atoms and a carbon-containing substituent selected from the groups described, the total number of carbon atoms of the alkyl group (as $R^{01}$, etc.) inclusive of the substituent should fall within the range recited.

In general formula (II'), the 5-membered ring that may contain a hetero atom is exemplified by a cyclopentene, a cyclopentadiene, an imidazole, a thiazole, a pyrazole, an oxazole, an isoxazole, a thiophene, a furan, and a pyrrole ring, and the 6-membered ring that may contain a hetero atom is exemplified by a benzene, a pyridine, a piperazine, a piperidine, a morpholine, a pyrazine, a pyrone, and a pyrrolidine ring.

Examples of the alkyl group having 1 to 4 carbon atoms as represented by $R^a$, $R^b$, $R^c$, $R^d$, $R^e$, $R^f$, $R^g$, $R^h$, and $R^i$ in general formula (III) are the same as those enumerated with reference to general formula (II). Examples of the alkylene group having 1 to 10 carbon atoms as represented by Q in general formula (III) include methylene, ethylene, trimethylene, propylene, tetramethylene, butylene, isobutylene, ethylethylene, dimethylethylene, pentamethylene, hexamethylene, heptamethylene, octamethylene, 1,4-pentanediyl, decamethylene, ethane-1,1-diyl, and propane-2,2-diyl. Examples of the alkylene group whose methylene moiety is substituted with —O—, —S—, —CO—, —COO—, —OCO—, —SO$_2$—, —NH—, —CONH—, —NHCO—, —N=CH—, or —CH=CH— include methyleneoxy, ethyleneoxy, oxymethylene, thiomethylene, carbonylmethylene, carbonyloxymethylene, methylenecarbonyloxy, sulfonylmethylene, aminomethylene, acetylamino, ethylenecarboxyamide, ethaneimidoyl, ethenylene, and propenylene.

The alkyl group having 1 to 4 carbon atoms as represented by $R^a$, $R^b$, $R^c$, $R^d$, $R^e$, $R^f$, $R^g$, $R^h$, and $R^i$ and the alkylene group as represented by Q in general formula (III) may have a substituent. Examples of the substituent are the same as those enumerated with reference to general formula (I).

In the cases where $R^a$, $R^b$, $R^c$, $R^d$, $R^e$, $R^f$, $R^g$, $R^h$, or $R^i$ is the alkyl group having 1 to 4 carbon atoms substituted with a carbon-containing substituent selected from the groups described, the total number of carbon atoms of the alkyl group inclusive of the carbon atoms of the substituent should fall within the range recited.

Of the compounds of the invention preferred are those represented by general formula (IV) below because of their absorption wavelengths and absorbances suited as an optical recording material using writing light with wavelengths of 380 to 420 nm.

[Formula 6]

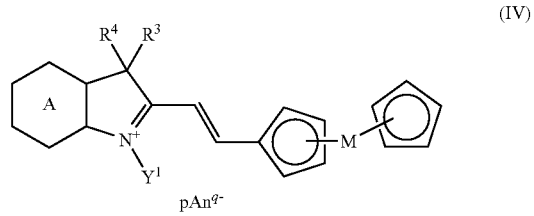

wherein ring A represents a 3- to 6-membered, carbocyclic, aromatic or heterocyclic ring; $R^3$ represents a group represented by general formula (II), (II'), or (III); $Y^1$ represents an organic group having 1 to 30 carbon atoms or a group represented by general formula (II), (II'), or (III); and $R^1$, $R^2$, $R^4$, M, $An^{q-}$, p, and q are as defined for general formula (I).

Examples of the 3- to 6-membered, carbocyclic, aromatic, or heterocyclic ring as represented by ring A in general formula (IV) include those recited for the ring structure formed by the connection of $R^1$ and $R^2$ in general formula (I).

Compounds of the invention in which $Y^1$ is a substituent represented by general formula (III) are preferred for their high heat resistance that is advantageous to provide high stability for use in an optical recording medium.

Of the compounds of the invention more preferred are those represented by general formula (V) or (VI) below for their excellent decomposition characteristics that are advantageous for use in high precision recording media.

[Formula 7]

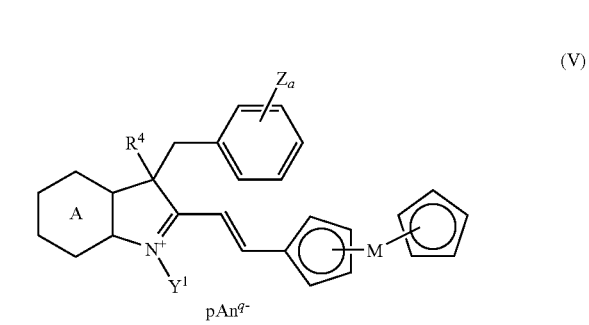

wherein ring A is as defined for general formula (IV); $Y^1$ represents an organic group having 1 to 30 carbon atoms or a group represented by general formulae (II), (II'), or (III); $R^4$, M, $An^{q-}$, p, and q are as defined for general formula (I); Z represents a halogen atom or a substituted or unsubstituted alkyl group having 1 to 4 carbon atoms, of which the methylene moiety may be substituted with —O— or —CO—; and a represents a number of 0 to 5.

[Formula 8]

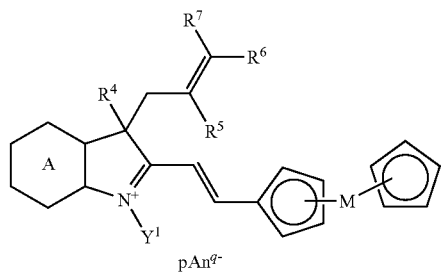

wherein ring A is as defined for general formula (IV); $Y^1$ represents an organic group having 1 to 30 carbon atoms or a group represented by general formulae (II), (II'), or (III); $R^4$, M, $An^{q-}$, p, and q are as defined for general formula (I); $R^5$, $R^6$, and $R^7$ each represent a halogen atom or a substituted or unsubstituted alkyl group having 1 to 4 carbon atoms, of which the methylene moiety may be substituted with —O— or —CO—.

The halogen atom as represented by Z in general formula (V) and $R^5$, $R^6$, and $R^7$ in general formula (VI) is exemplified by fluorine, chlorine, bromine, and iodine. Examples of the alkyl group with 1 to 4 carbon atoms as represented by Z in general formula (V) and $R^5$, $R^6$, and $R^7$ in general formula (VI) include those recited with respect to $R^{01}$, $R^{02}$, $R^{03}$, and $R^{04}$ in general formula (II).

In general formula (I), M represents Fe, Co, Ni, Ti, Cu, Zn, Zr, Cr, Mo, Os, Mn, Ru, Sn, Pd, Rh, Pt, or Ir. Compounds of the invention in which M is Fe are preferred for ease of synthesis and high solubility.

Specific examples of the compounds represented by general formula (I), hereinafter "compound(s) (I)", include compound Nos. 1 through 27, whose structural formulae are illustrated below in which only cations are shown. The double bonds in the compounds of the invention may take on a resonant structure.

[Formula 9]

Compound No. 1

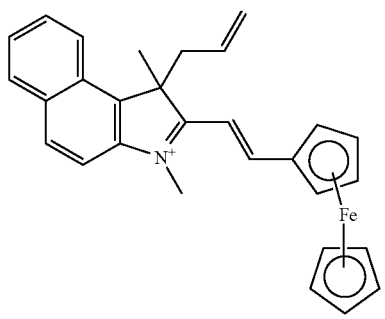

Compound No. 2

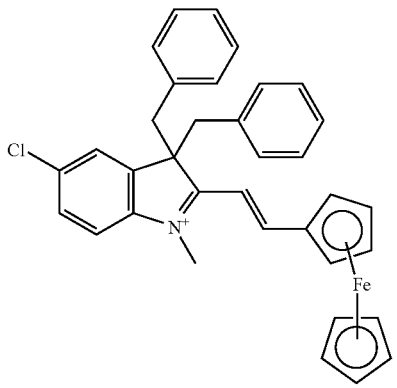

Compound No. 3

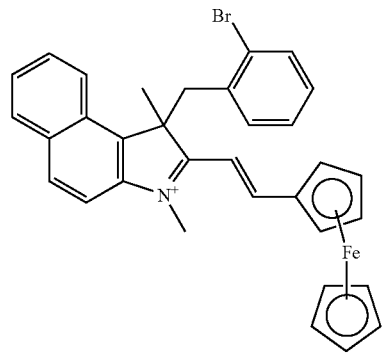

Coumpound No. 4

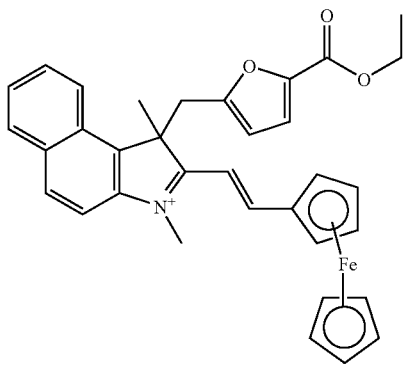

Compound No. 5

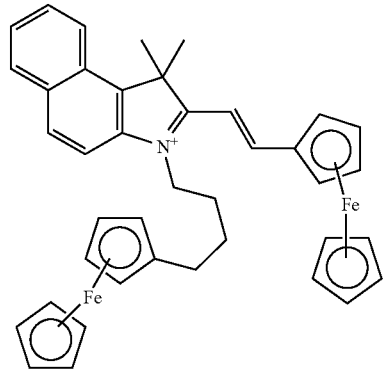

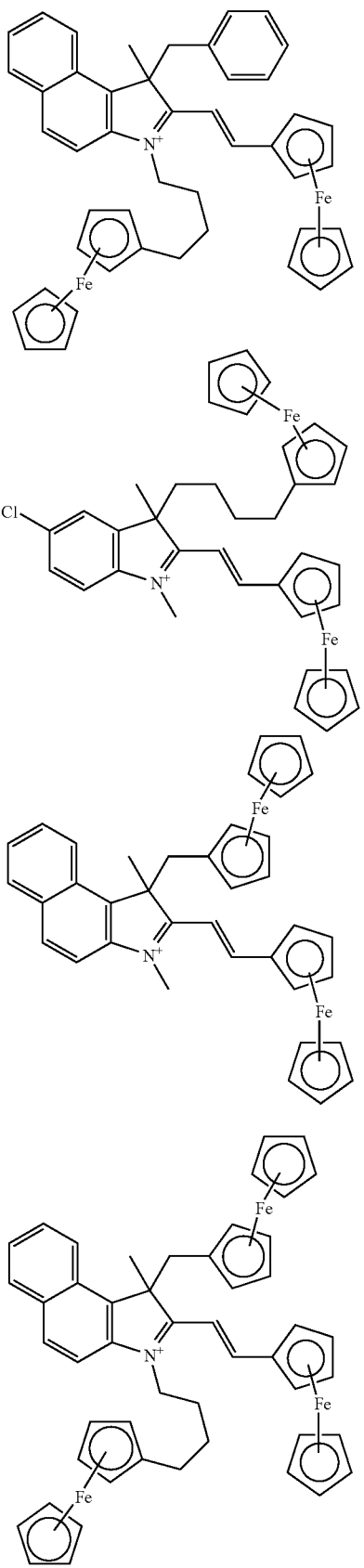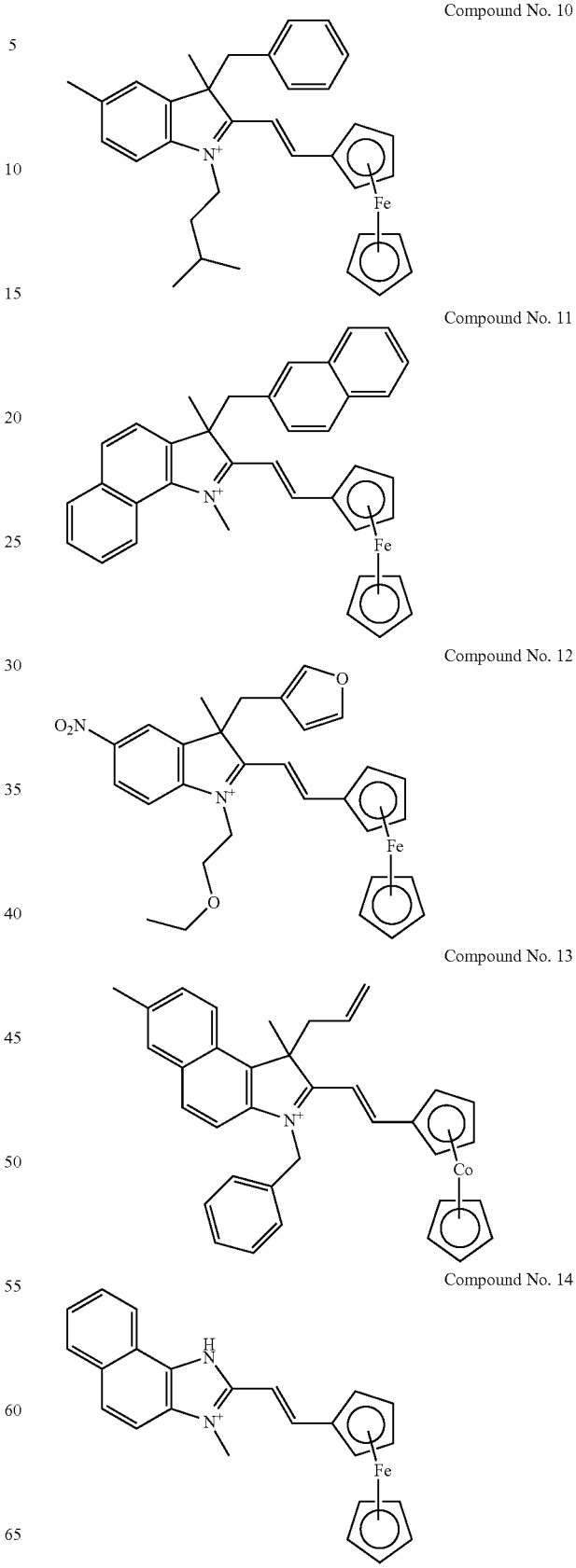

Compound No. 15
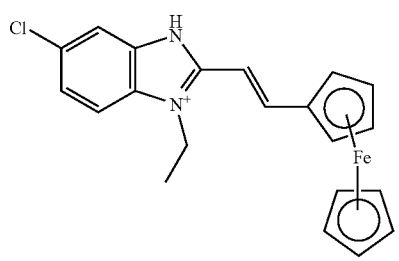
Compound No. 16
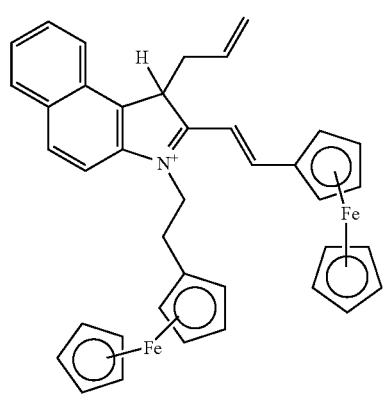
Compound No. 17
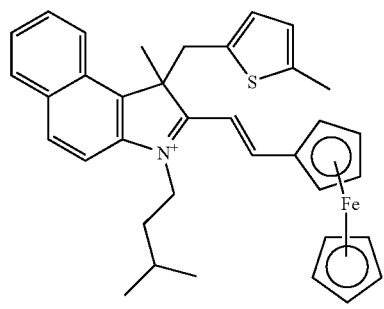
Compound No. 18
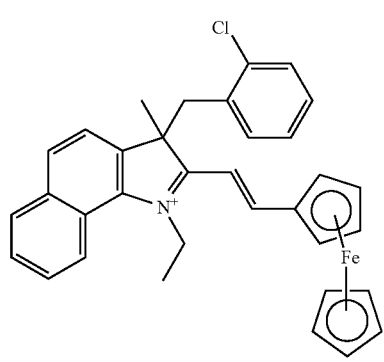
Compound No. 19
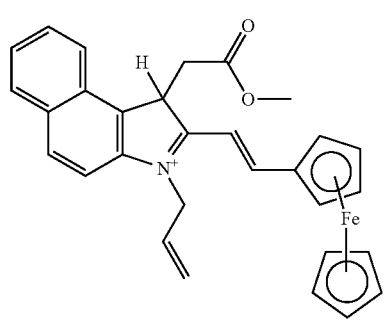
Compound No. 20
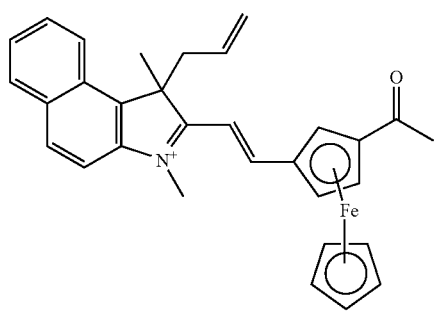
Compound No. 21
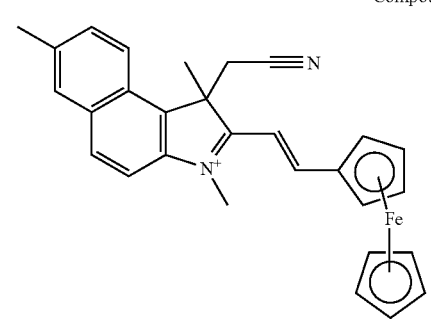
[Formula 11]
Compound No. 22
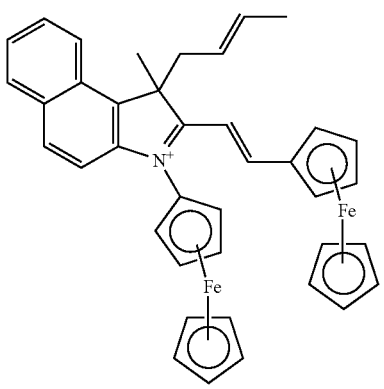
Compound No. 23
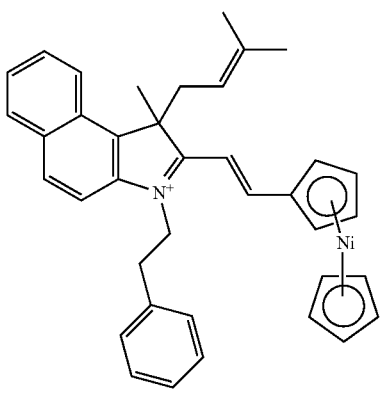

Compound No. 24
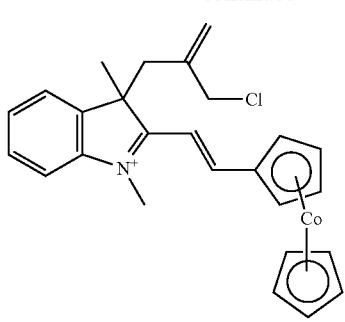

Compound No. 25
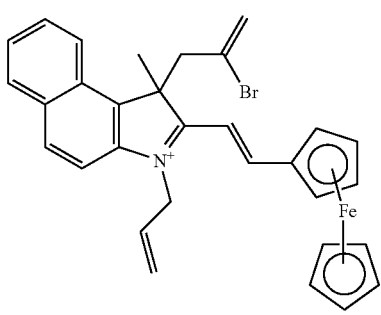

Compound No. 26
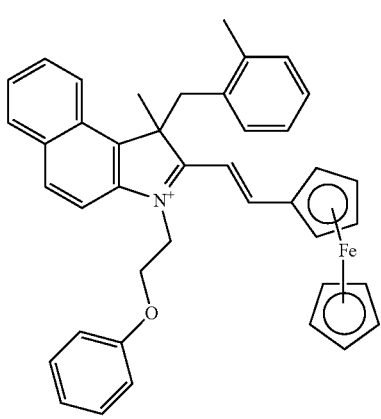

Compound No. 27
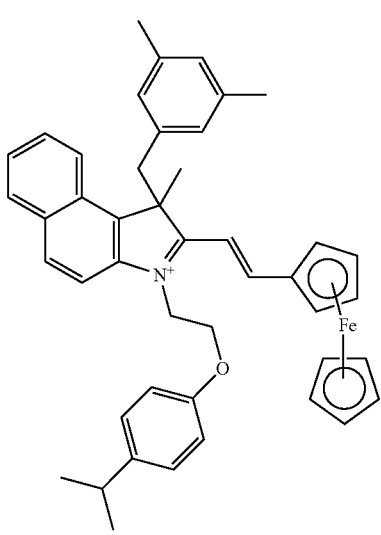

Compound Nos. 1 to 4, 6 to 13, and 16 to 27 belong to general formula (IV). Compound Nos. 2 to 4, 6, 10 to 12, 17, 18, 26, and 27 belong to general formula (V). Compound Nos. 1, 13, 16, and 19 to 25 belong to general formula (VI).

The compounds (I) according to the invention are not restricted by the process of preparation. For instance, they can be obtained by the process described in JP 2001-47740A.

The compound (I) according to the invention is useful as an optical recording material used to form an optical recording layer of an optical recording medium on which information is written in the form of a thermal information pattern with a laser, etc. It is especially suited for use in an optical recording layer of DVD-Rs, DVD+Rs, and optical recording media for blue lasers.

The optical recording material of the present invention that contains the compound of the invention will then be described. The optical recording material is used to form an optical recording layer on a substrate to provide an optical recording medium.

The optical recording material of the invention is a material used to form an optical recording layer and contains at least one compound (I).

As used herein, the term "the optical recording material of the invention" is used to include the compound (I) per se and a mixture of the compound (I) and an organic solvent described later and/or any other compound.

The method of forming an optical recording layer to provide an optical recording medium using the optical recording material of the present invention containing the compound (I) is not particularly limited. Generally followed methods include wet coating processes using an optical recording material of solution form that is prepared by dissolving the compound of the invention and, if desired, other compounds (hereinafter described) in an organic solvent. Suitable organic solvents include lower alcohols, such as methanol and ethanol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,3,3-tetrafluoropropanol; hydrocarbons, such as benzene, toluene, and xylene; and chlorinated hydrocarbons, such as methylene dichloride, dichloroethane, and chloroform. The solution can be applied to a substrate by spin coating, spraying, dipping, or a like coating method. The optical recording layer may also be formed by vacuum evaporation, sputtering, or a like technique. The concentration of the compound (I) in the optical recording material of solution form is preferably 0.1% to 10% by mass.

The optical recording layer is formed as a thin film usually with a thickness of 0.001 to 10 μm, preferably 0.01 to 5 μm.

The content of the compound (I) in the optical recording material is preferably 10% to 100% by mass based on the solids content of the optical recording material. The optical recording layer more preferably contains 50% to 100% by mass of the compound (I). In order to form an optical recording layer having the recited preferred content of the compound (I), it is more preferred for the optical recording material of the invention to contain 50% to 100% by mass of the compound (I) based on the solids content of the optical recording material.

The term "solids content of the optical recording material of the invention" refers to the total amount of components other than non-solid components including an organic solvent. The solids content of the optical recording material is preferably 0.01% to 100% by mass, more preferably 0.1% to 10% by mass.

If desired, the optical recording material of the invention may contain compounds commonly employed in an optical recording layer, such as cyanine compounds, azo compounds, phthalocyanine compounds, oxonol compounds, squarylium compounds, indole compounds, styryl compounds, porphin compounds, azulenium compounds, croconic methine compounds, pyrylium compounds, thiopyrylium compounds, triarylmethane compounds, diphenylmethane compounds, tetrahydrocholine compounds, indophenol compounds, anthraquinone compounds, naphthoquinone compounds, xanthene compounds, thiazine compounds, acridine compounds, oxazine compounds, spiropyran compounds, fluorene compounds, and rhodamine compounds. The optical recording material may further contain resins, such as polyethylene, polyester, polystyrene, and polycarbonate, surface active agents, antistatic agents, lubricants, flame retardants, radical scavengers (e.g., hindered amines), pit formation accelerators (e.g., ferrocene derivatives), dispersants, antioxidants, crosslinking agents, light resistance imparting agents, and so forth. The optical recording material may furthermore contain an aromatic nitroso compound, an aluminum compound, an iminium compound, a bisiminium compound, a transition metal chelate compound, and the like as a quencher, e.g., for singlet oxygen. For the same purpose, a quencher anion may be used. The total content of these various compounds in the optical recording material is preferably 0% to 50% by mass based on the solids content of the optical recording material.

The substrate on which the optical recording layer is provided is not particularly limited in material as long as it is substantially transparent to a write/read (recording/reproducing) light beam and includes resins, such as polymethyl methacrylate, polyethylene terephthalate, and polycarbonate, and glass. The substrate can have any shape according to use, including a tape, a drum, a belt, and a disk.

A reflective layer of gold, silver, aluminum, copper, etc. may be formed on the optical recording layer by vacuum evaporation or sputtering. A protective layer of an acrylic resin, a UV cured resin, etc. may be provided on the optical recording layer.

EXAMPLES

The present invention will now be illustrated in greater detail with reference to Preparation Examples, Examples, and Evaluation Examples, but it should be understood that the invention is not construed as being limited thereto.

Preparation Examples 1 through 8 illustrate synthesis of the compounds (I). Examples 1 through 8 illustrate production of optical recording materials and optical recording media of the invention using the compounds obtained in Preparation Examples 1 to 8. Comparative Examples 1 to 5 show the production of comparative optical recording materials and optical recording media using compounds having a different structure from that of the compound of the invention. In Evaluation Example 1 the compounds obtained in Preparation Examples 1 to 8 and comparative compound No. 2 were evaluated for light resistance. In Evaluation Example 2 the compounds obtained in Preparation Examples 1 to 8 and comparative compound Nos. 3 to 5 were evaluated for solubility. In Evaluation Example 3 the optical recording media obtained in Examples 1 to 8 and the comparative optical recording medium obtained in Comparative Example 1 were evaluated for suitability to writing/reading with a short wavelength laser. In Evaluation Example 4 the compounds obtained in Preparation Examples 1 to 8 were evaluated for heat resistance.

Preparation Examples 1, 2, and 4 to 8

Synthesis of Compound No. 1 in $ClO_4$ Salt Form and $PF_6$ Salt Form and Compound Nos. 2 to 6 in $ClO_4$ Salt Form In a reactor were put 24 mmol of an indolenine quaternary salt (bromide), 30 mmol of ferrocene carbaldehyde, and 26 g of chloroform, and the mixture was stirred at 85° C. for 9 hours. To the reaction mixture were added 30 mmol of sodium perchlorate or potassium hexafluorophosphate and 30 g of water, and the mixture was stirred at 60° C. for 1 hour, followed by oil/water separation. The solvent was removed by evaporation. The residue was recrystallized successively from 15 ml of a 1:1:1 mixed solvent of chloroform, acetone, and ethanol and 150 ml of a 1:2 mixed solvent of dimethylformamide and ethanol to give a corresponding $ClO_4$ or $PF_6$ salt of compound No. 1 or a corresponding $ClO_4$ salt of compound Nos. 2 to 6.

Preparation Example 3

Synthesis of Quencher (C) Salt of Compound No. 1

A mixture of 0.69 mmol of compound No. 1 in $ClO_4$ salt form, 0.69 mmol of a triethylamine salt of an anion represented by chemical formula (C), and 3.6 g of pyridine was stirred at 60° C. for 2 hours. After addition of 8 g of methanol, the reaction mixture was cooled to room temperature. The solid precipitated was collected by filtration and dried under reduced pressure to yield compound No. 1 in quencher anion (C) salt form.

The yields and analytical results of the compounds obtained in Preparation Examples 1 to 8 are shown in Tables 1 to 3 below. The decomposition point (decomp. p.) shown in Table 1 is a mass loss initiation temperature in differential thermal analysis at a temperature rise of 10° C./min.

TABLE 1

| Prepn. Example No. | Compound | Yield (%) | $\lambda_{max}$ (nm) | $\epsilon$ (×10$^4$) | M.P. (° C.) | Decomp. P. (° C.) |
|---|---|---|---|---|---|---|
| 1 | compound No. 1 $ClO_4$ salt | 35 | 433.5 | 2.18 | — | 191 |
| 2 | compound No. 1 $PF_6$ salt | 30 | 435.0 | 2.21 | 235 | 232 |
| 3 | compound No. 1 quencher(C) salt | 62 | 545.0 | 7.28 | 202 | 189 |
| 4 | compound No. 2 $ClO_4$ salt | 36 | 427.0 | 2.76 | — | 164 |
| 5 | compound No. 3 $ClO_4$ salt | 38 | 437.0 | 1.51 | — | 159 |
| 6 | compound No. 4 $ClO_4$ salt | 22 | 436.5 | 1.56 | — | 154 |
| 7 | compound No. 5 $ClO_4$ salt | 13 | 435.0 | 2.02 | — | 166 |
| 8 | compound No. 6 $ClO_4$ salt | 6 | 439.0 | 1.27 | — | 168 |

TABLE 2

| Prepn. Example No. | Compound | IR Absorption Spectrum (cm$^{-1}$) |
|---|---|---|
| 1 | compound No. 1 ClO$_4$ salt | 3085, 1671, 1595, 1576, 1532, 1455, 1416, 1373, 1363, 1308, 1264, 1238, 1172, 1083 |
| 2 | compound No. 1 PF$_6$ salt | 3085, 1595, 1576, 1531, 1455, 1415, 1374, 1362, 1308, 1263, 1239, 1172, 1139 |
| 3 | compound No. 1 quencher(C) salt | 3435, 3079, 2971, 1706, 1611, 1573, 1521, 1460, 1413, 1389, 1343, 1322 |
| 4 | compound No. 2 ClO$_4$ salt | 3087, 1574, 1529, 1454, 1415, 1374, 1296, 1264, 1244, 1185, 1093 |
| 5 | compound No. 3 ClO$_4$ salt | 3500, 2924, 1590, 1573, 1529, 1454, 1414, 1374, 1298, 1260 |
| 6 | compound No. 4 ClO$_4$ salt | 3431, 3083, 2979, 1714, 1592, 1574, 1531, 1455, 1415, 1397, 1375, 1300 |
| 7 | compound No. 5 ClO$_4$ salt | 3465, 3090, 2935, 1589, 1572, 1522, 1446, 1407, 1375, 1352, 1297, 1261 |
| 8 | compound No. 6 ClO$_4$ salt | 3500, 3086, 2935, 1590, 1572, 1521, 1437, 1397, 1375, 1362, 1297, 1262 |

TABLE 3

| Prepn. Example No. | Compound | $^1$H-NMR (DMSO-d6) |
|---|---|---|
| 1 | compound No. 1 ClO$_4$ salt | 8.66 (d, 1H, J = 15.9 Hz), 8.49 (d, 1H, J = 8.5 Hz), 8.25-8.16 (m, 2H), 8.01 (d, 1H, J = 8.8 Hz), 7.80-7.67 (m, 2H), 7.15 (d, 1H, J = 15.7 Hz), 5.27 (s, 2H), 5.04 (s, 2H), 4.89 (m, 1H), 4.76-4.64 (m, 2H), 4.34 (s, 5H), 4.05 (s, 3H), 3.57-3.40 (m, 2H), 2.00 (s, 3H) |
| 2 | compound No. 1 PF$_6$ salt | 8.66 (d, 1H, J = 15.9 Hz), 8.49 (d, 1H, J = 8.5 Hz), 8.25-8.16 (m, 2H), 8.01 (d, 1H, J = 8.8 Hz), 7.8-7.67 (m, 2H), 7.15 (d, 1H, 1 = 15.7 Hz), 5.27 (s, 2H), 5.04 (s, 2H), 4.89 (m, 1H), 4.76-4.64 (m, 2H), 4.34 (s, 5H), 4.05 (s, 3H), 3.57-3.40 (m, 2H), 2.00 (s, 3H) |
| 3 | compound No. 1 quencher(C) salt | 9.00 (d, 2H), 8.65 (d, 1H), 8.44 (d, 1H), 8.23 (d, 1H), 8.16 (d, 1H), 7.99 (d, 1H), 7.85 (dd, 2H), 7.77 (t, 1H), 7.70 (t, 1H), 7.65 (d, 2H), 7.14 (d, 1H), 6.55 (d, 2H), 6.35 (dd, H), 5.73 (d, 2H), 5.26 (s, 2H), 5.09 (s, 2H), 4.88 (m, 1H), 4.72 (d, 1H), 4.65 (d, 1H), 4.34 (s, 5H), 4.04 (s, 3H), 3.55 (m, 1H), 3.41 (m, 1H), 3.28 (q, 8H), 2.00 (s, 3H), 1.00 (1, 12H) |
| 4 | compound No. 2 ClO$_4$ salt | 9.01 (d, 1H, J = 15.6 Hz), 8.16 (s, 1H), 7.52-7.38 (m, 2H), 7.19 (d, 1H, J = 15.6 Hz), 7.08-7.06 (m, 6H), 6.72-6.71 (m, 4H), 5.35 (s, 2H), 5.2 (s, 2H), 4.40 (s, 5H), 4.02-3.88 (m, 4H), 3.51 (s, 3H) |
| 5 | compound No. 3 ClO$_4$ salt | 8.44 (d, 1H), 8.31 (d, 1H), 8.21 (d, 1H), 8.12 (d, 1H), 7.96 (d, 1H), 7.67-7.63 (m, 2H), 7.33 (d, 1H), 7.10-7.00 (m, 3H), 6.69 (d, 1H), 5.21 (s, 1H), 5.09 (s, 1H), 5.03 (d, 2H), 4.29-3.98 (m, 13H), 2.13 (s, 3H) |
| 6 | compound No. 4 ClO$_4$ salt | 8.74 (d, 1H), 8.49 (d, 1H), 8.16 (d, 1H), 8.12 (d, 1H), 7.91 (d, 1H), 7.78 (t, 1H), 7.67 (t, 1H), 7.23 (d, 1H), 6.77 (s, 1H), 5.66 (s, 1H), 5.33 (s, 1H), 5.24 (s, 1H), 5.06 (d, 2H), 4.37-4.10 (m, 9H), 4.02 (s, 3H), 2.08 (s, 3H), 1.17 (t, 3H) |
| 7 | compound No. 5 ClO$_4$ salt | 8.41 (d, 1H), 8.18 (d, 1H), 8.03 (d, 1H), 8.01 (d, 1H), 7.71 (t, 1H), 7.64 (t, 1H), 6.96 (d, 1H), 5.11 (t, 2H), 5.02 (t, 2H), 4.06 (t, 2H), 4.35 (s, 5H), 4.04 (s, 5H), 400 (t, 2H), 3.97 (t, 2H), 2.42 (t, 2H), 2.00 (s, 6H), 1.95 (m, 2H), 1.64 (m, 2H) |
| 8 | compound No. 6 ClO$_4$ salt | 8.62 (d, 1H), 8.38 (d, 1H), 8.04 (d, 1H), 7.97 (d, 1H), 7.78 (t, 1H), 7.68 (t, 1H), 6.95 (t, 1H), 6.94 (d, 1H), 6.82 (t, 2H), 6.27 (d, 2H), 5.28 (s, 1H), 5.11 (s, 1H), 5.10 (s, 1H), 5.04 (s, 1H), 4.27 (s, 5H), 4.11 (s, 5H), 4.10 (t, 2H), 4.07 (d, 1H), 4.04 (t, 2H), 3.84 (d, 1H), 2.22 (t, 2H), 2.17 (s, 3H), 1.39 (m, 2H), 1.22 (m, 2H) |

Examples 1 to 8

Production of Optical Recording Material and Optical Recording Medium

Each of the compounds obtained in Preparation Examples 1 to 8 was dissolved in 2,2,3,3-tetrafluoropropanol in a concentration of 1.0% by mass to prepare a solution as an optical recording material. A titanium chelate compound T-50 (available from Nippon Soda Co., Ltd.) was applied to a 12 cm diameter polycarbonate disk substrate, followed by hydrolysis to form a primer layer having a thickness of 0.01 μm. The 2,2,3,3-tetrafluoropropanol solution was applied onto the primer layer by spin coating to form an optical recording layer having a thickness of 100 nm. The resulting optical recording media were designated as optical recording medium Nos. 1 to 8.

Comparative Examples 1 to 5

A comparative optical recording material was prepared in the same manner as in Examples 1 to 8 except for using each of comparative compound Nos. 1 through 5 shown below in place of the compounds obtained in Preparation Examples 1 to 8. An optical recording medium (designated No. 1 to 5) was made using the resulting optical recording material in the same manner as in Examples 1 to 8.

[Formula 12]

Comparative compound No. 1

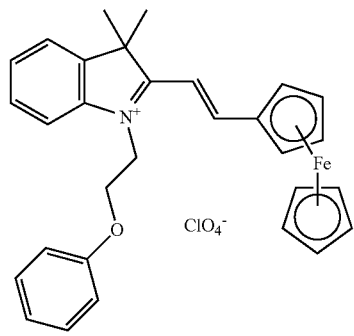

Comparative compound No. 2

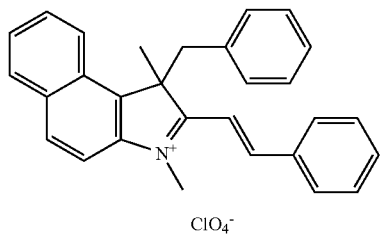

Comparative compound No. 3

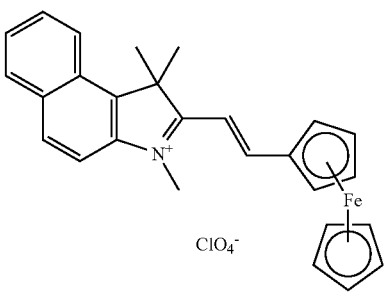

Comparative compound No. 4

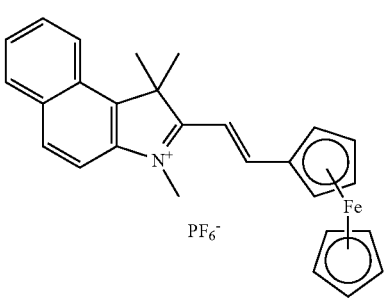

-continued

Comparative compound No. 5

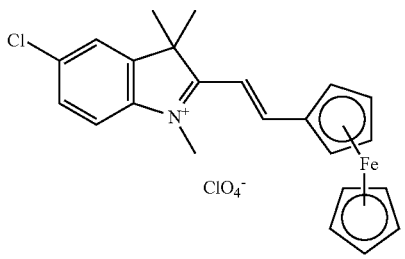

Evaluation Examples 1-1 to 1-8 and Comparative Evaluation Example 1-1

Evaluation of Light Resistance of Compounds (I)

The compounds obtained in Preparation Examples 1 to 8 and comparative compound No. 2 were evaluated for light resistance as follows. Each of the compounds was dissolved in 2,2,3,3-tetrafluoropropanol to prepare a 1% by mass solution. The solution was applied to a 20 mm by 20 mm polycarbonate plate by spin coating at 2000 rpm for 60 seconds to prepare a specimen. The specimen was irradiated with 55000 lux light for 100 hours. The UV absorption spectra measured before and after the irradiation were compared to calculate an absorbance retention at the $\lambda_{max}$ of the UV absorption spectrum before the irradiation. The results obtained are shown in Table 4 below.

TABLE 4

| Evaluation Example No. | Compound | Absorbance Retention (%) |
| --- | --- | --- |
| 1-1 | compound No. 1 $ClO_4$ salt | 91.7 |
| 1-2 | compound No. 1 $PF_6$ salt | 94.4 |
| 1-3 | compound No. 1 quencher(C) salt | 89.1 |
| 1-4 | compound No. 2 $ClO_4$ salt | 91.1 |
| 1-5 | compound No. 3 $ClO_4$ salt | 92.1 |
| 1-6 | compound No. 4 $ClO_4$ salt | 81.3 |
| 1-7 | compound No. 5 $ClO_4$ salt | 92.6 |
| 1-8 | compound No. 6 $ClO_4$ salt | 90.2 |
| Comparative Evaluation Example 1-1 | comparative compound No. 2 | 0 |

As is apparent from Table 4, the compounds (I) according to the present invention have a high absorbance retention even after 100 hour irradiation and are thus proved suitable for use in optical recording media. In contrast, the comparative compound was found poor in light resistance, showing an absorbance retention of 0% after 100 hour irradiation.

Evaluation Examples 2-1 to 2-8 and Comparative Evaluation Example 2-1

Evaluation of Solubility of Compounds (I)

The compounds obtained in Preparation Examples 1 to 8 and comparative compound Nos. 3 to 5 were evaluated for solubility in 2,2,3,3-tetrafluoropropanol at 25° C. as follows. Each of the compounds was dissolved in 2,2,3,3-tetrafluoropropanol in a concentration varying from 0.5% to 10% by mass. Whether the compound dissolved or not dissolved at a certain concentration was decided with the naked eye. The results are shown in Table 5.

TABLE 5

| Evaluation Example No. | Compound | Soluble at Concentration (mass %) |
|---|---|---|
| 2-1 | compound No. 1 $ClO_4$ salt | 2.0 |
| 2-2 | compound No. 1 $PF_6$ salt | 2.0 |
| 2-3 | compound No. 1 quencher(C) salt | 2.0 |
| 2-4 | compound No. 2 $ClO_4$ salt | 10.0 |
| 2-5 | compound No. 3 $ClO_4$ salt | 2.0 |
| 2-6 | compound No. 4 $ClO_4$ salt | 10.0 |
| 2-7 | compound No. 5 $ClO_4$ salt | 3.0 |
| 2-8 | compound No. 6 $ClO_4$ salt | 2.0 |
| Comparative Evaluation Example 2-1 | comparative compound No. 3 | 1.0 |
| Comparative Evaluation Example 2-2 | comparative compound No. 4 | 1.0 |
| Comparative Evaluation Example 2-3 | comparative compound No. 5 | 0.5 |

It was thus confirmed that the compounds of the invention exhibit higher solubility than the comparative compounds and are suited for use in an optical recording material.

Evaluation Examples 3-1 to 3-8 and Comparative Evaluation Example 3-1

The optical recording medium Nos. 1 to 8 obtained in Examples 1 to 8 and comparative optical recording medium No. 1 obtained in Comparative Example 1 were measured for UV absorption spectrum and UV reflection (incidence angle: 5°, on the optical recording layer) spectrum. The results obtained are shown in Table 6.

TABLE 6

| Evaluation Example No. | Optical Recording Medium No. | Compound | $\lambda_{max}$ (nm) | Reflected Light $\lambda_{max}$ (nm) | Reflectance (%) |
|---|---|---|---|---|---|
| 3-1 | 1 | compound No. 1 $ClO_4$ salt | 434.0 | 468.0 | 16.9 |
| 3-2 | 2 | compound No. 1 $PF_6$ salt | 432.0 | 470.0 | 15.3 |
| 3-3 | 3 | compound No. 1 quencher(C) salt | 564.0 | 582.0 | 34.1 |
| 3-4 | 4 | compound No. 2 $ClO_4$ salt | 425.0 | 460.0 | 15.8 |
| 3-5 | 5 | compound No. 3 $ClO_4$ salt | 442.0 | 458.0 | 21.4 |
| 3-6 | 6 | compound No. 4 $ClO_4$ salt | 436.0 | 461.0 | 20.5 |
| 3-7 | 7 | compound No. 5 $ClO_4$ salt | 436.0 | 477.0 | 20.7 |
| 3-8 | 8 | compound No. 6 $ClO_4$ salt | 441.0 | 463.0 | 20.3 |
| Compara. Evaluation Example 3-1 | compara. medium No. 1 | compara. compound No. 1 | 414.0 | 469.0 | 10.3 |

As is apparent from the results in Table 6, the optical recording media having an optical recording layer formed of the optical recording material of the invention have $\lambda_{max}$ in a range of from about 420 to 450 nm in the UV absorption spectrum. This indicates that any of them is writable with laser light of 380 to 420 nm. The optical recording media having an optical recording layer formed of the optical recording material of the invention had higher reflectances than the comparative optical recording medium and were thus proved highly suitable as an optical recording medium.

Evaluation Examples 4-1 to 4-8

The compounds obtained in Preparation Examples 1 to 8 were evaluated for heat resistance as follows. Each of the compounds of the invention was dissolved in 2,2,3,3-tetrafluoropropanol to prepare a 1% by mass solution. The solution was applied to a 20 mm by 20 mm polycarbonate plate by spin coating at 2000 rpm for 60 seconds to prepare a specimen. The specimen was placed in a hot air circulating thermostat dryer set at 80° C. for 120 hours. The UV absorption spectra measured before and after the heating were compared to calculate an absorbance retention at the $\lambda_{max}$ of the UV absorption spectrum before the heating. The results obtained are shown in Table 7 below.

TABLE 7

| Evaluation Example No. | Compound | Absorbance Retention (%) |
|---|---|---|
| 4-1 | compound No. 1 $ClO_4$ salt | 88.3 |
| 4-2 | compound No. 1 $PF_6$ salt | 92.2 |
| 4-3 | compound No. 1 quencher(C) salt | 90.8 |
| 4-4 | compound No. 2 $ClO_4$ salt | 92.1 |
| 4-5 | compound No. 3 $ClO_4$ salt | 93.5 |
| 4-6 | compound No. 4 $ClO_4$ salt | 90.1 |
| 4-7 | compound No. 5 $ClO_4$ salt | 96.8 |
| 4-8 | compound No. 6 $ClO_4$ salt | 95.4 |

As is apparent form Table 7, the compounds (I) according to the present invention show a high absorbance retention even after 120 hour heating at 80° C. and are thus proved suitable for use in optical recording media. Compound Nos. 5 and 6 exhibit particularly high heat resistance, proving highly superior for use in optical recording media.

INDUSTRIAL APPLICABILITY

The present invention provides an optical recording material suitable for the formation of an optical recording layer of an optical recording medium for short wavelength writing light. The compound used in the optical recording material is highly soluble and exhibits absorption wavelength characteristics suited for the formation of an optical recording layer of an optical recording medium for short wavelength writing light. An optical recording medium having an optical recording layer formed by using the optical recording material of the invention is characterized by excellent light resistance.

The invention claimed is:
1. An optical recording material comprising at least one compound represented by general formula (I):

[Formula 1]

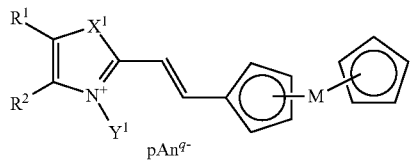

(I)

wherein $R^1$ and $R^2$ each independently represent a hydrogen atom, a hydroxyl group, a halogen atom, a nitro group, a cyano group, a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom; $R^1$ and $R^2$ may be taken together to form a ring structure; $X^1$ represents —$CR^3R^4$— or —NH—; $Y^1$ represents a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom; $R^3$ and $R^4$ each represent a hydrogen atom, a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom, provided that, when $Y^1$ is a group represented by general formula (III), $R^3$ is a hydrogen atom, a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom, and when $Y^1$ is a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom, $R^3$ is a group represented by general formulae (II), (II') or (III); M represents Fe, Co, Ni, Ti, Cu, Zn, Zr, Cr, Mo, Os, Mn, Ru, Sn, Pd, Rh, Pt, or Ir; $An^{q-}$ represents a q-valent anion, p is a number necessary to neutralize an electric charge; and q is 1 or 2,

[Formula II and II']

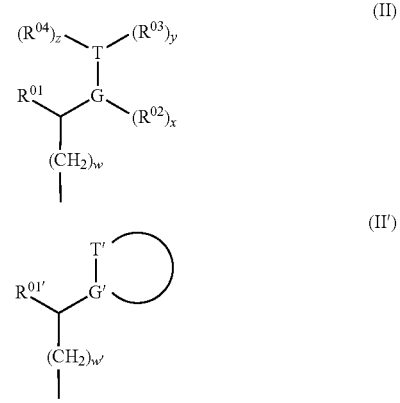

in the general formula (II), the bond between G and T is a double bond, a conjugated double bond, or a triple bond; G represents a carbon atom; T represents a carbon atom, an oxygen atom, or a nitrogen atom; w represents a number of 0 to 4; x, y, and z each represent 0 or 1 provided that, when T is oxygen, y=z=0, and when T is nitrogen, y+z=0 or 1; $R^{01}$, $R^{02}$, $R^{03}$, and $R^{04}$ each independently represent a hydrogen atom, a hydroxyl group, a cyano group, a nitro group, a halogen atom, or a substituted or unsubstituted alkyl group having 1 to 4 carbon atoms, the methylene moiety of which may be substituted with —O— or —CO—; and $R^{01}$ and $R^{04}$ may be taken together to form a ring structure; in the general formula (II'), the bond between G' and T' is a double bond or a conjugated double bond; G' represents a carbon atom; T' represents a carbon atom or a nitrogen atom; w' represents a number of 0 to 4; $R^{01'}$ represents a hydrogen atom, a hydroxyl group, a cyano group, a nitro group, a halogen atom, or a substituted or unsubstituted alkyl group having 1 to 4 carbon atoms, of which the methylene moiety may be substituted with —O— or —CO—; and the ring containing G' and T' is a 5-membered ring that may contain a hetero atom, a 6-membered ring that may contain a hetero atom, a naphthalene ring, a quinoline ring, an isoquinoline ring, an anthracene ring, or an anthraquinone ring and may be substituted with a halogen atom, a nitro group, a cyano group, an alkyl group or an alkoxy group,

[Formula III]

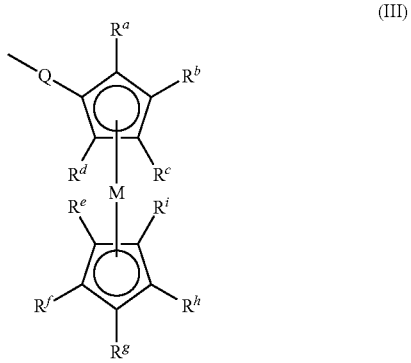

wherein $R^a$, $R^b$, $R^c$, $R^d$, $R^e$, $R^f$, $R^g$, $R^h$, and $R^i$ each independently represent a hydrogen atom or a substituted or unsubstituted alkyl group having 1 to 4 carbon atoms, the methylene moiety of which may be substituted with —O— or —CO—; Q represents a single bond or a substituted or unsubstituted alkylene group having 1 to 10 carbon atoms, of which the methylene group may be substituted with —O—, —S—, —CO—, —COO—, —OCO—, —SO$_2$—, —NH—, —CONH—, —NHCO—, —N=CH—, or —CH=CH—; and M is as defined above.

2. The optical recording material according to claim 1, wherein the optical recording material comprises at least one compound represented by general formula (IV):

[Formula IV]

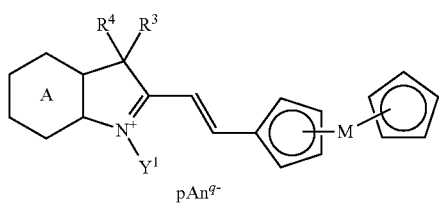

(IV)

wherein ring A represents a 3- to 6-membered, carbocyclic, aromatic or heterocyclic ring; $R^3$ represents a group represented by general formula (II), (II'), or (III); $Y^1$ represents a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom.

3. The optical recording material according to claim 2, wherein $Y^1$ in general formula (IV) is a group represented by general formula (III).

4. The optical recording material according to claim 2, wherein the optical recording material comprising at least one compound represented by general formula (V):

[Formula V]

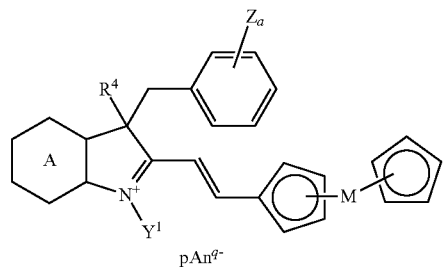

(V)

wherein $Y^1$ represents a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom, Z represents a halogen atom or a substituted or unsubstituted alkyl group having 1 to 4 carbon atoms, of which the methylene moiety may be substituted with —O— or —CO—; and a represents a number of 0 to 5.

5. The optical recording material according to claim 2, wherein the optical recording material comprising at least one compound represented by general formula (VI):

[Formula VI]

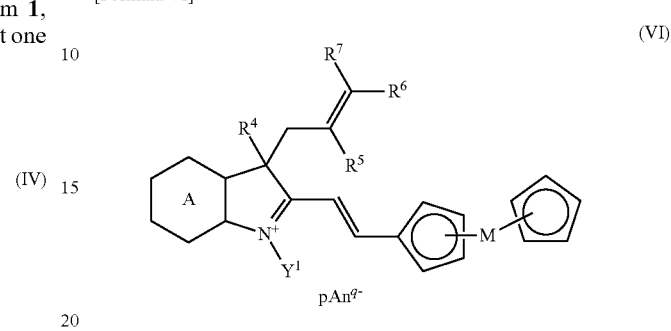

(VI)

wherein $Y^1$ represents a group represented by general formula (III), or a hydrocarbon group selected from an alkyl, an akenyl, an alkylaryl or an arylalkyl group having 1 to 30 carbon atoms, or any of these hydrocarbon groups which is interrupted with an ether linkage or a thioether linkage, and the above recited hydrocarbon groups may be substituted with an alkoxy group, an alkenyl group, a nitro group, a cyano group or a halogen atom; $R^5$, $R^6$, and $R^7$ each represent a halogen atom or a substituted or unsubstituted alkyl group having 1 to 4 carbon atoms, of which the methylene moiety may be substituted with —O— or —CO—.

6. The optical recording material according to claim 1, wherein M in general formulae (I) or (III) is Fe.

7. An optical recording medium comprising a substrate and an optical recording layer on the substrate, the optical recording layer being formed of the optical recording material according to claim 1.

8. The optical recording material according to claim 2, wherein M in general formulae (I), (III) or (IV) is Fe.

9. The optical recording material according to claim 3, wherein M in general formulae (I), (III) or (IV) is Fe.

10. The optical recording material according to claim 4, wherein M in general formulae (I), (III) or (V) is Fe.

11. The optical recording material according to claim 5, wherein M in general formulae (I), (III) or (VI) is Fe.

12. An optical recording medium comprising a substrate and an optical recording layer on the substrate, the optical recording layer being formed of the optical recording material according to claim 2.

13. An optical recording medium comprising a substrate and an optical recording layer on the substrate, the optical recording layer being formed of the optical recording material according to claim 3.

14. An optical recording medium comprising a substrate and an optical recording layer on the substrate, the optical recording layer being formed of the optical recording material according to claim 4.

15. An optical recording medium comprising a substrate and an optical recording layer on the substrate, the optical recording layer being formed of the optical recording material according to claim 5.

16. An optical recording medium comprising a substrate and an optical recording layer on the substrate, the optical recording layer being formed of the optical recording material according to claim 6.

* * * * *